United States Patent
Holt, Jr.

[11] Patent Number: 5,915,335
[45] Date of Patent: Jun. 29, 1999

[54] DOG CAR RESTRAINT

[75] Inventor: Robert C. Holt, Jr., North Canton, Ohio

[73] Assignee: Coastal Pet Products, Inc., Alliance, Ohio

[21] Appl. No.: 09/122,705

[22] Filed: Jul. 27, 1998

[51] Int. Cl.[6] .................................................. B60R 22/00
[52] U.S. Cl. ........................... 119/771; 119/770; 119/792
[58] Field of Search ..................... 119/771, 770, 119/792, 774, 772, 864; 434/255

[56] References Cited

U.S. PATENT DOCUMENTS

| | | | |
|---|---|---|---|
| 4,970,991 | 11/1990 | Luce ....................................... | 119/771 |
| 5,427,061 | 6/1995 | McCullough ........................... | 119/771 |
| 5,471,953 | 12/1995 | Sporn ..................................... | 119/792 |
| 5,676,093 | 10/1997 | Sporn ..................................... | 119/792 |
| 5,794,571 | 8/1998 | Goldberg ................................ | 119/792 |

OTHER PUBLICATIONS

Coastal Pet Products, Inc. "Product catalog", 3 pages, (undated) date unknown.
Coyote Pet Products, Inc. advertisement, 1 page, (undated) date unknown.
Ethical Products, Inc. "Profiles in Pet Accessories" advertisement, 3 pages, (1996).
Golden Pet Products advertisement, 2 pages, (undated) date unknown.
Hamilton Products advertisement, 2 pages, (undated) date unknown.
Hi–Craft "Dog Car Harness" advertisement, 3 pages, (undated) date unknown.
Leather Brothers "KwikKlip®" advertisement, 2 pages, (undated) date unknown.
Pets International advertisement, 3 pages, (1998).
Vo–Toys, Incorporated advertisement, 3 pages (undated) date unknown.

*Primary Examiner*—Michael J. Carone
*Assistant Examiner*—Judith A. Nelson
*Attorney, Agent, or Firm*—Renner, Kenner, Greive, Bobak, Taylor & Weber

[57] ABSTRACT

A dog restraining harness (10) for use in an automobile includes an adjustable collar (20) and girth straps (30) that securely fasten around a dog's upper and lower chest area. The ends of the collar strap (20) are connected, at the dog's back, by a fastening device (50) positioned between them and in close proximity to the ends thereof, the ends themselves attaching to respective metal rings (15, 16). The ends of the girth strap (30) are also connected at the dogs back by a similar fastening device (52) with the ends themselves being attached to the same metal rings (15, 16) as the ends of the collar strap (20). Also connected between the metal rings (15, 16) is a harness strap (12) which provides an insertion area for a car's seatbelt (S). The seatbelt (S) is inserted through the area provided by the harness strap (12) and connected in the normal manner. A padded chest piece (40) may be connected between the collar (20) and girth straps (30). If an accident occurs, all stress on the harness (10) will be borne by the rings (15, 16) and not by the devices (50, 42) which merely serve as a bridge for the ends of the collar strap (20) and the girth strap (30).

13 Claims, 3 Drawing Sheets

DOG CAR RESTRAINT

TECHNICAL FIELD

The present invention relates generally to a dog harness. More particularly, the present invention relates to a dog harness that attaches to a seatbelt of a vehicle to better protect and secure a dog in case of an accident.

BACKGROUND ART

Whether heading to the local park or the dreaded veterinarian, dogs are common passengers in their master's automobiles. While some dogs feel right at home sitting on a car seat or sticking their head out of the car's window, many dogs are uncomfortable in a moving vehicle and constantly move around within the vehicle thereby distracting the driver from watching the road and maintaining the same level of control over the vehicle which they would if undistracted. Well-behaved or not, it is unsafe for the dog to be unsecured in the car because an abrupt stop, or even a sharp turn, can cause the dog to be jostled around and injured. When accidents occur, the force with which a dog gets thrown around inside the vehicle can cause serious, and sometimes fatal, injury to the dog.

Also, if an accident occurs, frightened and injured animals within the car can impede medical personnel from administering care to potentially injured passengers. The fact that the injured dog is loose within the car is a significant problem in these circumstances because, if frightened to the point of violence, the medical personnel may have to deal with the dog first, slowing down their response time to the injured passengers. Indeed, even if unharmed and nonaggressive, a dog free to move within a crashed car can cause trouble for medical personnel simply by interfering with them doing their jobs.

A known dog harness device for use in an automobile provides adjustable collar and girth straps which attach around a dog's neck and lower chest area, respectively. A chest piece bridges these two straps and extends vertically, from the collar strap to the girth strap along the dog's chest. The dog and girth straps intersect at the dog's back and are secured to each other as well as to a harness loop which accepts the insertion of a car's seatbelt. Thus, a dog wearing the harness can be secured to a car's seatbelt and restrained within a car. However, this device may not provide adequate protection if an accident occurs.

The collar and girth straps of the prior art device circle the dog's neck and chest area and are attached by a plastic buckle system. The straps intersect at the dog's back so that one end of the collar strap, bearing an insertion end of a buckle, encircles the dog's neck area and engages a receiving end of a buckle carried on one end of the girth strap. Similarly, the other end of the girth strap, bearing an insertion end of a buckle, encircles the dog's lower chest area and engages a receiving end of a buckle carried on the other end of the collar strap. These buckles, when mated, are in close proximity to the intersection of the straps and are stress points of the harness device. In the event of an accident, the large forces exerted on the collar and girth straps could cause the buckles on those straps to fail thereby releasing the dog from the harness and exposing it to harm.

Thus, there exists a need in the art for a dog harness for use in a car which will not only secure a dog from roaming around the car and distracting the driver, but will also provide adequate protection to the dog in the case of an accident and keep the dog restrained so that it may not impede medical personnel from administering care to other passengers. Furthermore, such a harness would need to fit comfortably on the dog because, if the dog is uncomfortable, the dog may whine and fidget around and distract the driver. Therefore, an uncomfortable harness would be counter productive to one of the benefits that such a car harness is to provide. Finally, the harness should adapt quickly and easily to a dog's body and should be able to be used in any type of car. Inasmuch as every car provides its passengers with a seatbelt safety feature, the needs described above would best be served by providing a dog car harness that could be quickly attached to a car's seatbelt.

DISCLOSURE OF THE INVENTION

In light of the foregoing, it is an object of the present invention to provide a dog car harness that prohibits a dog from roaming around within a vehicle and distracting the driver from paying attention to the road.

It is another object of the present invention to provide a dog car harness, as above, that prevents a dog from being thrown around and injured during abrupt stops and sharp turns, or in the event of a car accident.

It is still another object of the present invention to provide a dog car harness, as above, that will, in the event that an accident does occur, restrain the dog within the car to allow medical personnel to administer care to persons involved in the accident without being impeded by the dog.

It is yet another object of the present invention to provide a dog car harness, as above, that secures a dog to the seatbelt provided in a car.

It is another object of the present invention to provide a dog car harness, as above, that can be adjusted to fit dogs of varying shapes and sizes.

It is still yet another object of the present invention to provide a dog car harness, as above, that, when worn, does not cause the dog a great deal of discomfort.

These and other objects of the present invention, as well as the advantages thereof over existing prior art forms, which will become apparent from the description to follow, are accomplished by the improvements hereinafter described and claimed.

In general, a car harness for a dog includes a harness strap having a first metal ring attached to one end thereof and a second metal ring attached to the opposing end thereof. A collar strap has one end thereof attached to the first metal ring and its opposing end attached to the second metal ring. A girth strap has one end thereof attached to the first metal ring and its opposing end attached to the second metal ring. A chest strap is connected between the collar strap and the girth strap.

A preferred exemplary dog car harness incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
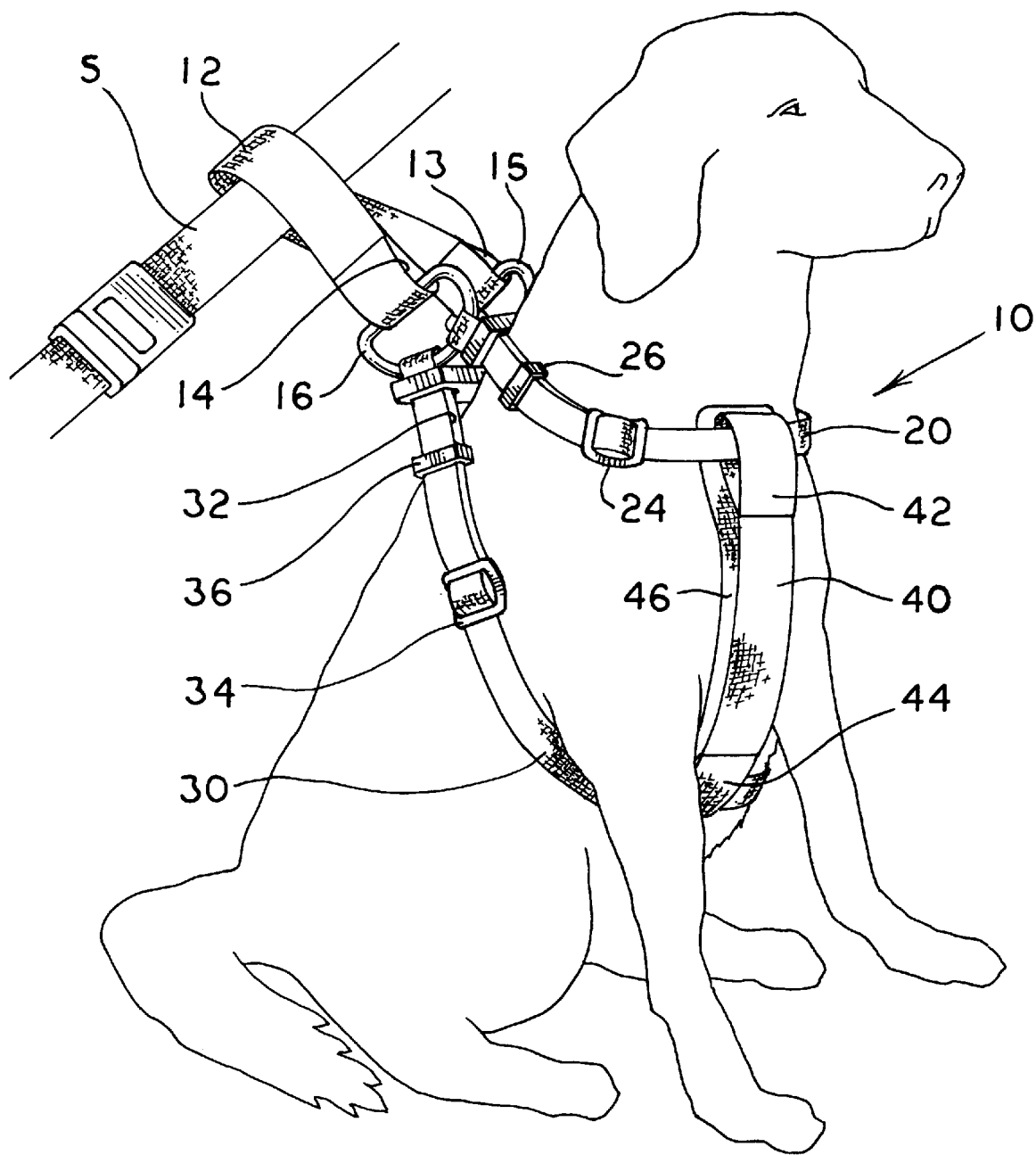
FIG. 1 is a front perspective view of a dog car harness made in accordance with the present invention and showing it as it would be worn by a dog riding as a passenger in an automobile.

A dog car harness made in accordance with the present invention is indicated generally by the numeral 10 in the accompanying drawings. Dog car harness 10 can be utilized in conjunction with a car's seatbelt S or a shoulder belt to secure a dog within the car. Thus, as shown, seatbelt S is passed through the loop provided by harness strap 12 which attaches, through left attachment loop 13 and right attachment loop 14, to left connection ring 15 and right connection ring 16, respectively. Attachment loops 13, 14 may be formed by inserting an end of harness strap 12 through its respective connection ring 15, 16 and looping this end back on itself securely fastening the end of the strap by means such as box stitching, fusing, riveting, stapling and the like. It should, however, be appreciated that the present invention is not limited to such an attachment and other methods for attaching harness strap 12 to connection rings 15, 16 may be employed.

Also connected between left connection ring 15 and right connection ring 16 is a collar strap 20 which, as can be seen in FIG. 1, fits around the base of a dog's neck, above the shoulders of a dog's forelegs. Collar strap 20 attaches to left connection ring 15 by means of left collar loop 21 which is formed in the same manner as that described for left and right attachment loops 13, 14. Similarly, a right collar loop 22 loops around and attaches to right connection ring 16. In the preferred embodiment of the present invention, collar strap 20 is adjustable, and therefore, attaches to right connection ring 16 by extending therethrough and looping back in on itself to attach to an adjustment slide 24. Thus, adjustment slide 24 can be moved to various positions along collar strap 20 and thereby lengthen or shorten collar strap 20 to accommodate different sized dogs. Adjusting collar strap 20 through adjustment slide 24 will increase or decrease the size of right collar loop 22 attached thereto. To secure right collar loop 22 around right connection right 16, a closure tab 26 is provided. Closure tab 26 surrounds right collar loop 22 and may be slid to a position near to right connection ring 16 to prevent the formation of slack between right connection ring 16 and right collar loop 22.

It should be appreciated that, while in describing the preferred embodiment of the present invention, certain features of the dog car harness 10 are disclosed as being positioned on the "right" or "left" side of dog car harness 10 for convenience only, and the positioning of such features may be reversed and fall within the scope of the present invention. For example, adjustment slide 24 could be formed with left collar loop 21 inasmuch as designations of left and right are only utilized to facilitate disclosure.

Figure 2:
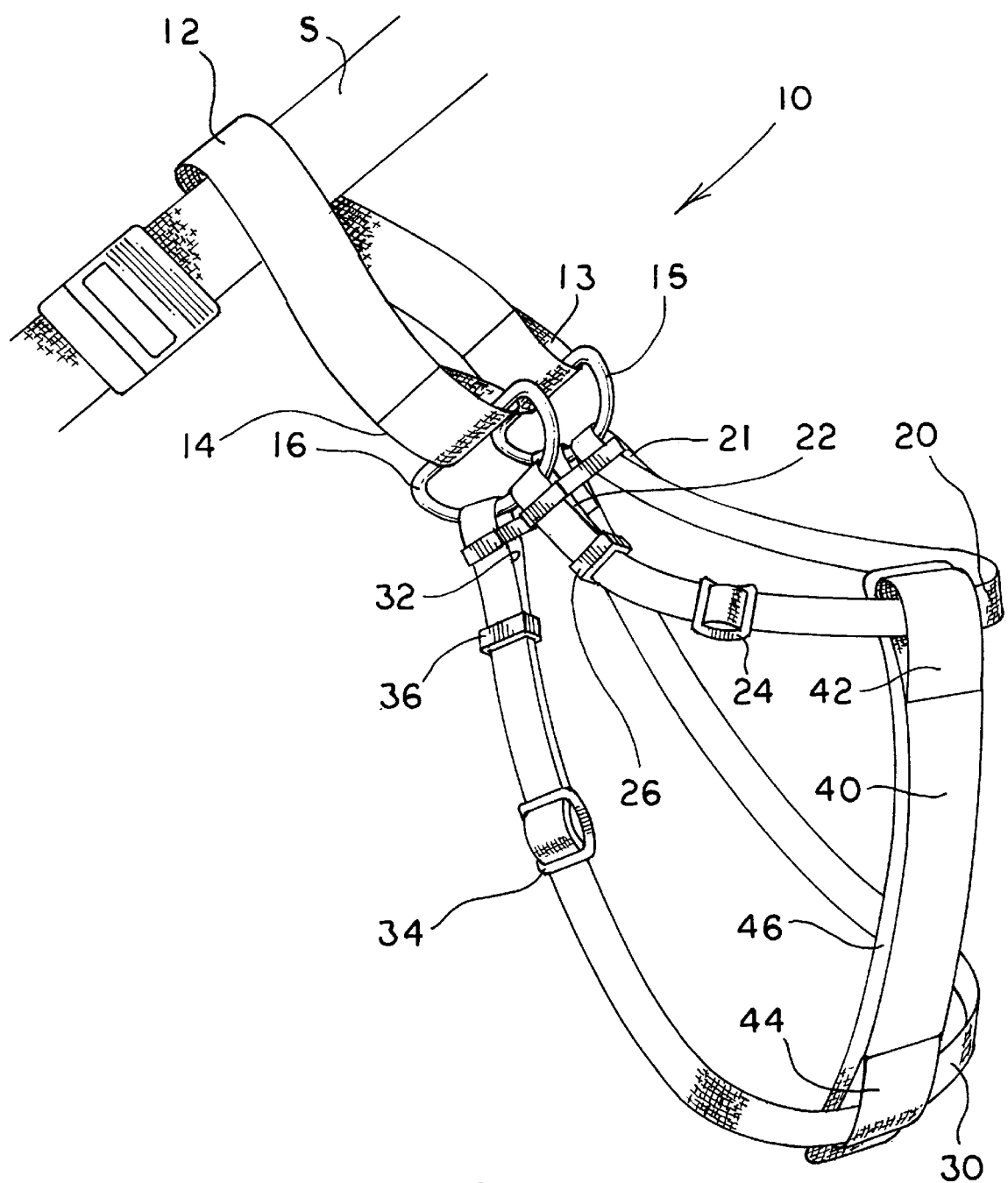
FIG. 2 is a perspective view like FIG. 1 but showing the dog car harness without the dog.

Also attached to right and left connection rings 16 and 15 is a girth strap 30. As seen in FIG. 1, girth strap 30 fits around a dog's lower chest area and extends underneath the dog's forelegs. Aside from being longer in length than collar strap 20, girth strap 30 is generally identical to collar strap 20 in that it attaches to left and right connection rings 15, 16 in an identical manner. Therefore, girth strap 30 has a left girth loop 31, a right girth loop 32, an adjustment slide 34, and a closure tab 36. In the preferred embodiment, connection rings 15, 16 are D-rings with the ends of harness strap 12 connecting to the flat portion thereof, and collar strap 20 and girth strap 30 connecting to the curved part thereof; however, the present invention is not limited to such D-rings. For example, connection rings 15 and 16 could merely be stampings of some suitable metallic material. As seen in FIGS. 1 and 2, girth strap 30 attaches to connection rings 15, 16 below collar strap 20. Although girth strap 30 could connect to connection rings 15, 16 above collar strap 20, this would cause a crossing of collar strap 20 with girth strap 30 and such a positioning is not preferred, although it is contemplated by the scope of the present invention.

A chest strap 40 connects collar strap 20 to girth strap 30 by receiving collar strap 20 through collar strap loop 42 and receiving girth strap 30 through girth strap loop 44. Loops 42, 44 are preferably formed by doubling the ends of chest strap 40 back in on themselves and stitching the ends to create a loop. Connecting chest strap 40 through loops 42, 44 allows chest strap 40 to slide along the length of collar strap 20 and girth strap 30 so that the position of chest strap 40 can be adjusted to place chest strap 40 along a dog's chest even if the collar strap 20 and girth strap 30 must be adjusted for different sized dogs. However, it should be appreciated that collar strap 20 and girth strap 30 may be connected to the ends of chest strap 40 in any manner, the above-described means of connection being preferred only and not limiting. As can be seen in FIG. 1, chest strap 40 fits squarely along the dog's chest between the dog's forelegs. To provide a more comfortable fit and additional safety to the dog in the case of an accident, chest strap 40 may be provided with a padded chest piece 46 attached to its inner surface. Padded chest piece 46, in addition to absorbing some forces during abrupt stops or accidents, also provides a more comfortable fit so that the dog has less of a tendency to become agitated when wearing dog car harness 10.

For purposes of strength and comfort, it is preferred that harness strap 12, collar strap 20, girth strap 30 and chest strap 40 are constructed of nylon, although any equivalent material which provides adequate protection during an accident or abrupt stop falls within the scope of the present invention.

Figure 3:
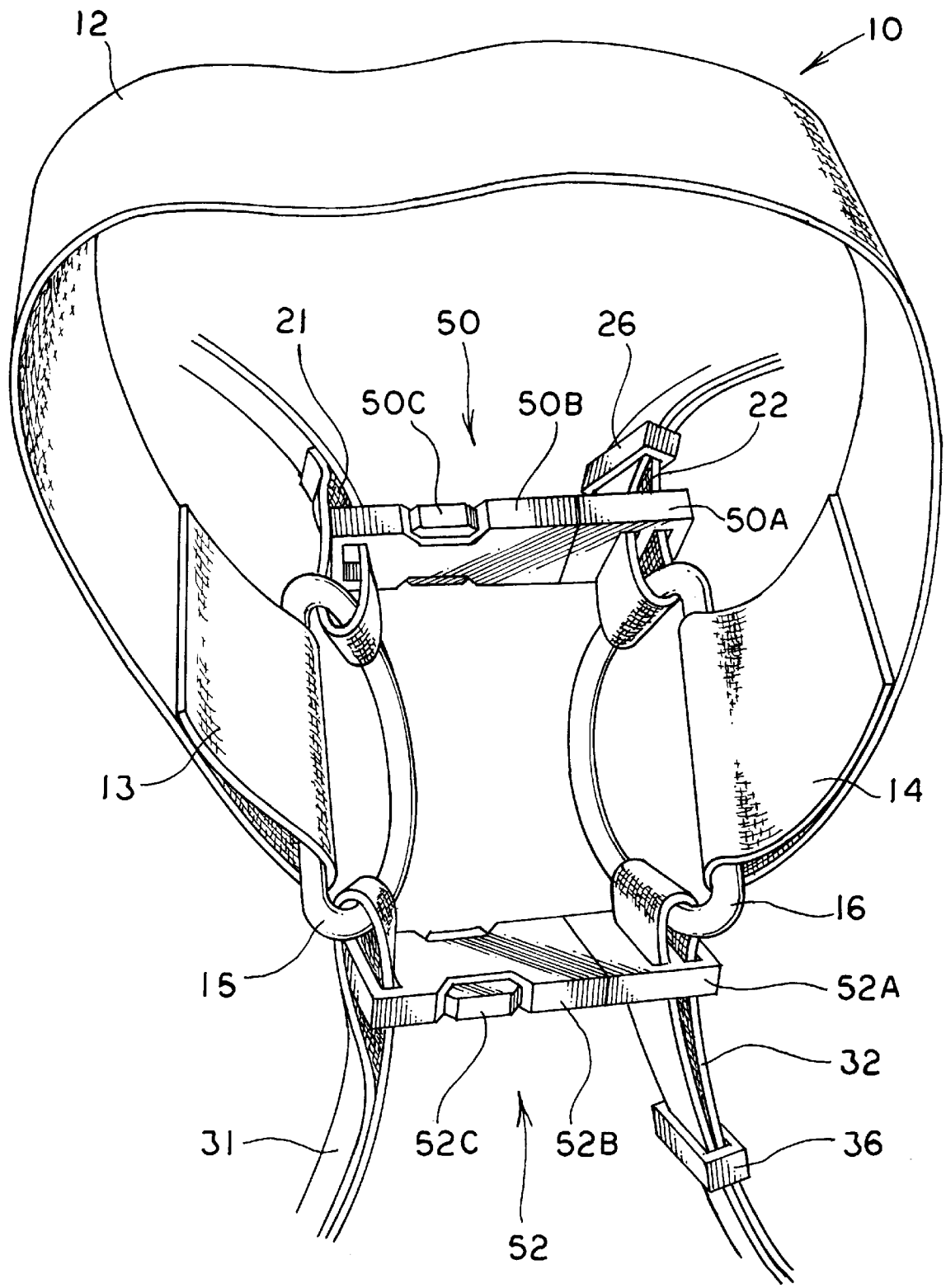
FIG. 3 is a rear perspective view of the dog car harness shown in FIG. 2.

Although dog car harness 10 can function with the configuration described hereinabove, it is preferred that the ends of collar strap 20 and girth strap 30 be releasably connected at the dog's back so as to more adequately secure the dog within the confines of collar strap 20 and girth strap 30. As such, and as shown in FIG. 3, the engagement of the ends of collar strap 20 can be accomplished by a collar buckle 50 while the engagement of the ends of girth strap 30 can be accomplished by girth buckle 52. Collar buckle 50 has an insertion end 50A attached to right collar loop 22 and a receiving end 50B attached to left collar loop 21. Mating insertion end 50A with receiving end 50B serves as a bridge between the ends of collar strap 20 thereby creating a continuous collar loop and making it possible to securely fit collar strap 20 around a dog's neck through adjustment of adjustment slide 24. Collar buckle 50 keeps the ends of collar strap 20 positioned at the back of the dog's neck so that collar strap 20 can be adjusted to the appropriate length to securely fasten around the circumference of the dog's neck. Collar buckle 50 may be opened by depressing release buttons 50C carried by insertion end 50A. Girth buckle 52 and girth strap 30 work together in a similar manner to allow for a secure adjustment of girth strap 30 around the dog's lower chest area. Thus, girth buckle 52 has an insertion end 52A carrying release button 52C and a receiving end 52B attached to right girth loop 32 and left girth loop 31, respectively.

As stated hereinabove, the positioning of the insertion end and receiving end of buckles 50, 52 are disclosed as being connected to "right" and "left" girth loops 32, 31 for convenience only and their positions may be switched and fall within the scope of the present invention. It should also be appreciated that buckles 50, 52 are disclosed as a preferred means for providing a bridge between the ends of collar strap 20 and girth strap 30, but any means may be used to bring the ends of harness 10, collar strap 20 and girth strap 30 into close proximity to provide a continuous loop around the dog's collar and girth and provide an insertion area for a seatbelt. In the buckle configuration described, connection rings 15, 16, not the weaker buckles 50, 52, are the main stress points of the harness and absorb a large amount of the forces impacting dog car harness 10 when a dog is thrown about during an abrupt stop or an accident. Therefore, connection rings 15, 16 should be constructed of high strength metals or other high strength materials.

When fitting dog car harness 10 onto a dog, collar buckle 50 and girth buckle 52 are disengaged, thereby providing a large insertion area for the dog's body. The dog's right leg is placed over girth strap 30 on the right side of the chest strap 40 and the left leg is placed over girth strap 30 on the left side of chest strap 40 and girth buckle 52 and collar buckle 50 are then engaged thereby diminishing the insertion area initially provided for the dog's body. Collar strap 20 and girth strap 32 are then adjusted by adjustment slides 24 and 34 so that a secure fit of dog car harness 10 is achieved. Engaging buckles 50 and 52 also causes harness strap 12 to provide an insertion area for a car's seatbelt S, and seatbelt S is placed through this insertion area and secured to the belt buckle so that the dog is now confined within the car yet able to sit or lie down in a normal manner.

In view of the foregoing, it should be evident that a dog car harness constructed as described herein, accomplishes the objects of the invention and otherwise substantially improves the art. While a preferred embodiment of the invention has been presented and described in detail, the invention is not limited thereto or thereby. Accordingly, for an appreciation of the true scope and breadth of the invention, reference should be made to the following claims.

What is claimed is:

1. A car harness for a dog comprising a harness strap, a first metal ring attached to one end of said harness strap, a second metal ring attached to the opposing end of said harness strap, a collar strap having one end attached to said first metal ring and the opposing end attached to said second metal ring, a girth strap having one end attached to said first metal ring and the opposing end attached to said second metal ring, and a chest strap connected between said collar strap and said girth strap.

2. A car harness for a dog according to claim 1 further comprising means for connecting the ends of said collar strap.

3. A car harness for a dog according to claim 2 wherein said means is a collar buckle.

4. A car harness for a dog according to claim 3 wherein said a collar buckle includes a receiving end connected near one end of said collar strap and an insertion end connected near the opposing end of said collar strap, wherein mating said insertion end with said receiving end brings the opposing ends of said collar strap into closer proximity and thereby brings said first and second metal rings into closer proximity.

5. A car harness for a dog according to claim 1 further comprising means for connecting the ends of said girth strap.

6. A car harness for a dog according to claim 5 wherein said means is a girth buckle.

7. A car harness for a dog according to claim 6 wherein said girth buckle includes a receiving end connected near one end of said girth strap and an insertion end connected near the opposing end of said girth strap, wherein mating said insertion end with said receiving end brings the opposing ends of said girth strap into closer proximity and thereby brings said first and second metal rings into closer proximity.

8. A car harness for a dog according to claim 1 wherein the length of said collar strap and said girth strap is adjustable.

9. A car harness for a dog according to claim 1 further comprising padding attached to said chest strap on the inside surface thereof.

10. A car harness for a dog according to claim 1 wherein said first and second metal rings are D-rings.

11. A car harness for a dog according to claim 1 wherein each of said straps is made of a nylon material.

12. A car harness for a dog according to claim 1, wherein the car includes a seatbelt and said harness strap is adapted to be engaged by the seatbelt.

13. A car harness for a dog according to claim 1, wherein said chest strap receives said collar strap through a loop on the top portion of said chest strap and receives said girth strap through a loop on the lower portion of said chest strap, thereby allowing for adjustment of the positioning of said chest strap.

\* \* \* \* \*